July 19, 1966  E. J. JOHNSTON  3,261,153
RAKE TOOTH CONSTRUCTION
Filed Oct. 8, 1964
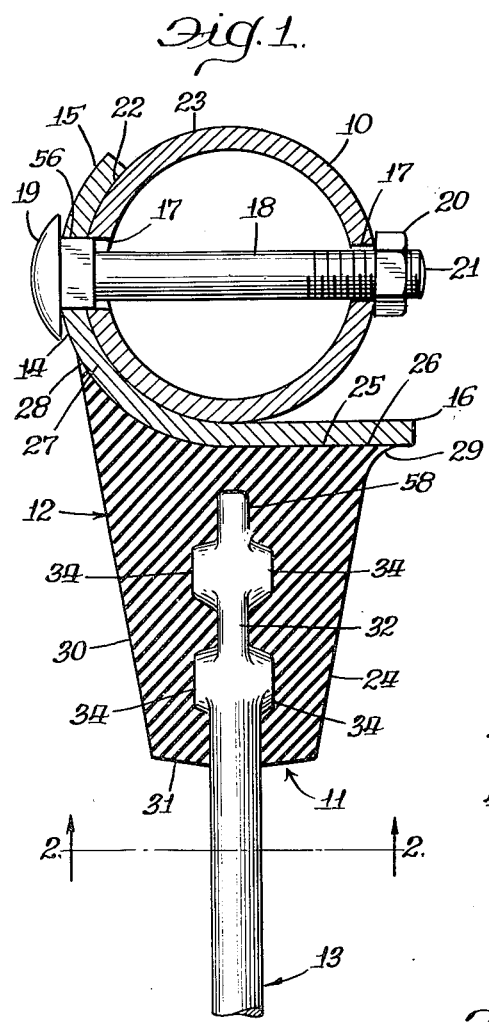
Fig. 1.
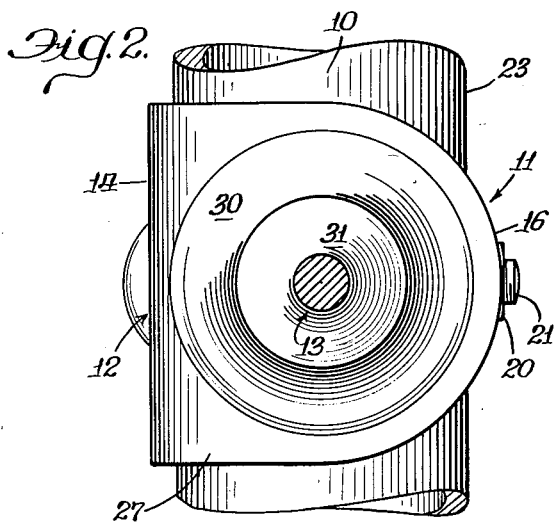
Fig. 2.
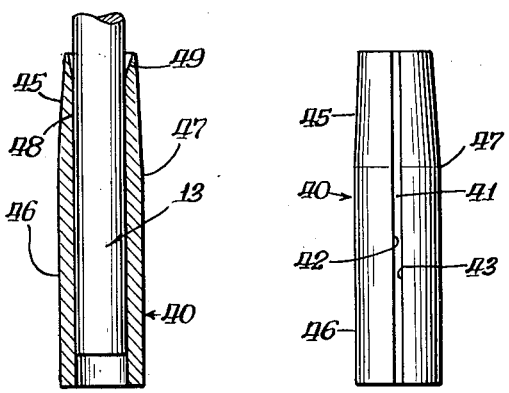
Fig. 3.  Fig. 4.
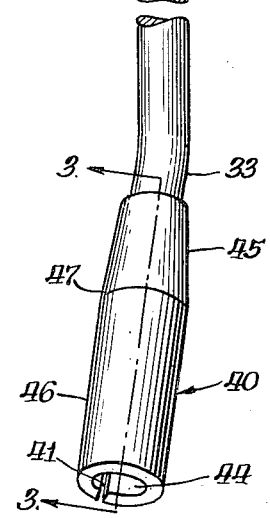
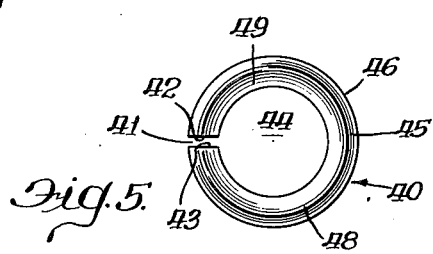
Fig. 5.
Inventor:
Edward J. Johnston
By John J. Kowalik
Atty.

United States Patent Office

3,261,153
Patented July 19, 1966

3,261,153
RAKE TOOTH CONSTRUCTION
Edward J. Johnston, La Grange, Ill., assignor to International Harvester Company, Chicago, Ill., a corporation of New Jersey
Filed Oct. 8, 1964, Ser. No. 402,431
7 Claims. (Cl. 56—400)

The instant invention relates to agricultural implements. Particularly it relates to rakes and the like. Specifically it relates to a rake tooth construction adapted for use in a side delivery rake or related implement.

A rake tooth is a structure which is connected to a farm implement or the like. The farm implement is generally a powered vehicle which carries an elongated angularly disposed rake bar for delivery of, for example, undried hay in a windrow to the side and parallel to the path of the vehicle. A rake tooth depends from its rake bar and generally comprises a rake tine and connector means for connecting the inner end of the tine to the rake bar.

The prior art discloses utilization of an elastomer or rubber-like structure disposed at the inner end of a tine which is mounted on a rake bar to provide for cushioning or absorption of shock to minimize breakage and extend the life of a rake tooth beyond those in which connection to a rake bar is not padded or in which the shock is not cushioned. However, insufficient consideration heretofore has been given to the solution of other factors responsible for reducing tooth life. As a consequence, while the connector between a tine and its rake bar, including the impact absorbing block of elastomer or rubber fabrication, is able substantially to retain its integrity, a tine itself may lose its utility from a plurality of causes, with a consequent loss of an entire tooth including the connector.

Tine failure in conventional devices results from erosion or breaking of the tip or end portion of a tine from abrasive ground scraping or repeated ground striking during raking. It also arises by reason of the nature of the mounting or connection between the inner end of a tine and its rubber-like block or cushion component, as a consequence of which, the tines have a tendency to loosen and drop out from their mountings.

The general object of the instant invention is the provision of an improved rake tooth construction.

An additional object of the instant invention is to provide an improved and replaceable tip for rake tines or teeth.

Additionally, it is a further object of the invention to provide improved means for securing a tine in its rubber-like mounting.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:
FIG. 1 is a vertical sectional view of a rake bar and rake tooth embodying the instant invention but showing the tine in elevation.

FIG. 2 is a view of a segment of the rake bar taken substantially on the line 2—2 of FIG. 1 and looking in the direction of the arrows.

FIG. 3 is a view taken substantially on the line 3—3 of FIG. 1 and looking in the direction of the arrows.

FIG. 4 is an elevational view of the replaceable tine tip.

FIG. 5 is a view of the tine tip looking from the top of FIG. 4.

Referring now more particularly to the drawings, it is observed that only a portion of a rake bar 10 is seen in FIGS. 1 and 2. It will be appreciated that the rake bar 10 is, in a conventional manner, elongated, of metallic fabrication and may be of circular cross section, as illustrated in FIG. 1.

Additionally, the rake bar 10 has secured thereto a plurality of rake teeth generally designated by numeral 11 and which depend from and are spaced apart longitudinally of the rake bar 10. Each of said teeth 11 is substantially identical with the other thereof, and accordingly only one is shown in the drawings and described.

Each of the teeth 11 comprises a connector generally designated as 12 and a tine generally designated as 13. Each connector 12 comprises a clip 14 and a yieldable or bendable block 24.

The clip 14 may be of metal fabrication. In the illustrated embodiment, clip 14 is shaped like a J which has been rotated 90°. Said clip 14 has a lower leg 16 integral with a side or upper leg 15 which may be shorter than the lower leg 16.

The side leg 15 has an aperture 56 which can be aligned with a pair of diametric holes or apertures 17 in the rake bar 10 to accommodate a bolt or threaded pin 18, as illustrated in FIG. 1. The head 19 of the pin 18 engages the outer surface of leg 15 and may be drawn tight by a nut 20 releasably secured on the threaded end portion 21 of the bolt 18, as illustrated in FIG. 1.

The inner surface 22 of the leg 15 is preferably of substantially the same configuration as the outer surface 23 of the rake bar 10. In the illustrated embodiment, said leg is curved on a radius equal to the external radius of curvature of rake bar 10. Thereby, leg 15 can be snugly engaged against said rake bar to insure a rigid securance of clip 14 against said rake bar 10.

The lower leg 16 of the clip 14 may be flat and also lobate in peripheral configuration, as illustrated in FIG. 2. As shown to the right of FIGS. 1 and 2, said leg 16 may extend beyond the rake bar 10.

The block 24 depends from the leg 16. In the drawings, said block 24 has a design which presents transverse sections of circular configuration.

The upper surface 25 of the block 24 is secured or bonded by vulcanizing or the like to the lower surface 26 of the leg 16 along its entire length and to a medial section 27 of the clip 14. The medial section 27 is curved and is integral with and disposed between the side leg 15 and the lower leg 16. At its position of connection with the medial section 27, the block 24 presents an upwardly extending lip 28. A second lip 29 integral with the block 24 extends outwardly from the main bulk thereof and is connected to the leg 16 in a position opposite the lip 28.

The outer wall 30 of said block 24 tapers inwardly as it extends downwardly from the clip 14 to a base or bottom 31. Bottom 31, as shown in FIG. 1, may extend downwardly at an angle of slightly more than 90° from the lower end of the wall 30 toward tine 13.

The block 24 is fabricated from elastomer material such as rubber or the like, and said block 24 has imbedded therein the upper or inner end portion 32 of the tine 13. The entire outer surface 58 of portion 32 is bonded by means such as vulcanizing or the like in said block 24.

The tine 13 is preferably fabricated from a metal of conventional composition. Said tine 13 is elongated and extends downwardly or depends from the block 24. Tine 13 has a lower angularly offset portion 33 which is sloped in a usual or customary direction for the purpose of side delivery of hay or the like in a manner well known in the art.

The inner or upper end portion 32 of the tine is provided with a plurality of outwardly extending integral lugs 34. While there are shown four of such lugs in the drawing, the number and size thereof may be optionally varied depending upon experience or requirement. In the drawings, four lugs 34 are shown arranged in pairs extending outwardly from and perpendicular to the longitudinal axis of the tine 13. The lugs 34 of each pair are shown as being in transverse relationship and the pairs thereof are shown as being disposed in superposed relationship. The lugs 34 in effect are tine anchoring means which are embedded in block 24 and by reason of which the securance of the tine 13 is maximized.

Accordingly, likelihood of removal of the tine 13 from the block 24 by pulling or application of other force generally encountered in normal use is substantially minimized when considered in comparison with the means for anchoring taught in the prior art. Furthermore, by reason of the foregoing tine anchoring construction, the connection to the yieldable or bendable block 24 will outlive a tine of usual fabrication, because the tine itself is subjected to various destructive forces to which the connection is not.

To the end that the life of a tine be increased by eliminating or minimizing the erosive forces which occur at the end thereof, and in accordance with the instant invention, there is provided a novel replaceable tip, generally designated by the numeral 40. The tip 40 is releasably mounted on the outer end portion of bent tine section 33.

The tip 40 is of tube-like construction and is preferably fabricated from a material such as steel or equivalent material having spring-like characteristics. The tip 40 has an elongated slot 41 which extends from one end to the other thereof. The slot 41 is defined by a pair of parallel adjacent sides 42 and 43 which separate the tip 40 so that in cross section it has the configuration of a split ring, as illustrated in FIG. 5.

The bore or passage 44 formed within the tip 40 is of substantially uniform diameter through the length of the tip 40. The radius of curvature of the bore is substantially the same as, though preferably just slightly less than, the tine end portion 33, whereby the tip 40 may be pressed fit on said tine end portion 33 in the manner illustrated in FIG. 1 and 3. By reason of the split or slot 41, spring-like characteristics are imparted to the tip 40, whereby the tine end portion 33 will be securely releasably gripped by said tip.

The top 40 may be further characterized as having a lower outer wall portion 46 and an upper outer wall portion 45 extending downwardly and upwardly, respectively, from the split circle junction 47 of said wall portions 45 and 46. The lower outer wall portion 46 is of cylindrical configuration. The upper outer wall portion 45 is tapered or slopes inwardly as it extends upwardly from junction 47, in the manner illustrated in FIG. 1, 3 and 4. The tapered outer wall portion 45 covers approximately the upper third of the tip 40, while the lower outer portion 46 covers the remainder of said tip 40.

The inner wall 48 which defines the bore 44 of the tip 40 is flared outwardly, as at 49, toward the upper end of the tip 40, to provide a sloping guide to facilitate mounting of the tip 40 on the tine end portion 33.

By reason of the foregoing construction, a tip 40 may be readily mounted and secured on a tine end portion 33 and also removed after it has been worn or eroded and thereafter replaced with another like tip 40. By providing replaceable tips 40 as herein described together with the improved tine mounting means, the life of an entire tooth 11 is extended substantially beyond that of conventionally employed devices of the described class.

A feature of the present invention is in so constructing the connection of the inner end portion of the tine including the upset lugs 32 and 34 so as to obtain a larger area of engagement of the tine with the block than is provided by the normal cylindrical contour of the tine and thus develop resistance in proportion and opposition to the loading forces developed on the larger than normal tip or working end of the tine as provided by the replaceable sleeve 40. It will be seen that the diameter of thickness of the sleeve 40 presents a larger surface area than the normal area of the tine to engagement with the hay or other crop material. Therefore, enlarged cruciform shaped anchor end of the tine prevents tearing out of the tine from the mounting block. It will be also observed that the upper portion 45 of the replaceable tip or sleeve is conical and slopes downwardly to prevent hairpining of material thereon and provides easy flow of such material along the length of the tine.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not a limiting sense.

What is claimed is:

1. A rake tooth comprising an elongated tine; means for connecting said tine to a rake bar, and a spring-like protector replaceably mounted on and protectively covering a lower end portion of said tine, and said protector comprising a split tube snugly embracing said tine and having an open end portion extending beyond an adjacent end of the tine.

2. A rake tooth comprising an elongated tine; means for connecting the tine to a rake bar, and a spring-like structure replaceably mounted on and protectively covering a lower end portion of the tine, said structure comprising a split tube and said split tube having a cylindrical end portion and a tapered end portion axially aligned with said cylindrical end portion.

3. The rake tooth defined in claim 2 in which the cylindrical end portion is a lower split tube portion defined by a cylindrical outer wall and the tapered end portion is an upper split tube portion defined by an outer wall tapering inwardly and upwardly from said cylindrical end portion.

4. A raking element comprising means providing securement to an associated mechanism and including a block of elastomer material, a tine having an anchor end portion embedded in the material and having a working end portion spaced remotely from said material, said anchor end portion having a cross section providing a substantial area of engagement and connection between said material and said anchor end portion, and means comprising a replaceable element mounted in protective relation to the working end of the tine and presenting a working area larger than the normal working area of the tine, said element being a split tube having a tine receiving bore open at opposite ends of the element, said element extending beyond the working end of said tine.

5. A rake tooth; a connector including a clip and a yieldable block bonded to said clip; said connector releasably securable to a rake bar; an elongated tine having an angularly offset working end portion depending from said block, said tine having an inner end portion bonded to said block, and a replaceable spring tip element covering said end portion of the tine, whereby the longevity of said tine matches said connector, and said replaceable element comprising a sleeve member embracing said working end under hoop tension and having a generally cylindrical lower end portion and having a substantially conical upper end portion.

6. A metallic replaceable tip adapted to be placed upon the free end of a tine, said tip constituting the actual raking element and being of tubular C-shaped form in cross-section and being of spring material and having inherent radial flexibility to secure the element to the tine by tightly embracing said end of the tine.

7. The invention according to claim 6 and said element having a generally cylindrical cross section and having a tapered portion generally conical and tapering upwardly and said element having a tine-receiving internal bore.

References Cited by the Examiner

UNITED STATES PATENTS

| | | | |
|---|---|---|---|
| D. 29,068 | 7/1898 | Cary | 56—400 X |
| 22,235 | 12/1858 | Hadcock et al. | 56—400 |
| 301,660 | 7/1884 | Bean | 56—400 |
| 563,923 | 7/1896 | Guernsey | 56—400.21 |
| 1,340,669 | 5/1920 | Pavelka | 24—143 |
| 1,471,989 | 10/1923 | Weis | 56—400.21 |
| 2,583,767 | 1/1952 | Daignas. | |
| 2,783,701 | 5/1957 | Padrick | 172—750 X |
| 3,096,609 | 7/1963 | Garrett et al. | 56—400 |

ANTONIO F. GUIDA, *Primary Examiner.*

RUSSELL R. KINSEY, *Examiner.*